(12) United States Patent
Boyd et al.

(10) Patent No.: US 9,783,219 B2
(45) Date of Patent: Oct. 10, 2017

(54) TILLER KNOB ASSEMBLY FOR STEERING WHEEL

(71) Applicant: Crown Equipment Corporation, New Bremen, OH (US)

(72) Inventors: William S. Boyd, Troy, OH (US); Roger J. Quinlan, Jr., Troy, OH (US); Daniel L. White, Covington, OH (US); Kevin A. Gilliland, Coldwater, OH (US); Edward E. Shuret, Greenville, OH (US); Allen D. Sprague, Minster, OH (US)

(73) Assignee: Crown Equipment Corporation, New Bremen, OH (US)

( * ) Notice: Subject to any disclaimer, the term of this patent is extended or adjusted under 35 U.S.C. 154(b) by 175 days.

(21) Appl. No.: 14/255,438

(22) Filed: Apr. 17, 2014

(65) Prior Publication Data

US 2015/0298719 A1    Oct. 22, 2015

(51) Int. Cl.
*B62D 1/06* (2006.01)
*B62D 1/04* (2006.01)
*G05G 1/08* (2006.01)

(52) U.S. Cl.
CPC ............. *B62D 1/043* (2013.01); *G05G 1/085* (2013.01)

(58) Field of Classification Search
CPC ...... B62D 1/043; E05B 1/0007; E05B 1/0015
USPC .......................................................... 74/557
See application file for complete search history.

(56) References Cited

U.S. PATENT DOCUMENTS

| | | | | |
|---|---|---|---|---|
| 212,162 | A | * | 2/1879 | Tucker ................. E05B 1/0007 292/347 |
| 1,620,223 | A | * | 3/1927 | Norcross ................ B62D 1/043 74/557 |
| 2,432,262 | A | * | 12/1947 | Thorp .................... B62D 1/043 74/557 |
| 3,703,217 | A | * | 11/1972 | Kulick .................... B60K 28/06 180/272 |
| 4,991,461 | A | * | 2/1991 | Sennett .................... G05G 1/06 16/441 |
| 5,870,800 | A | * | 2/1999 | Chao ....................... B62D 1/043 16/422 |
| 6,526,845 | B2 | * | 3/2003 | Moc ........................ B62D 1/043 74/553 |

(Continued)

FOREIGN PATENT DOCUMENTS

EP           1843364 A2 * 10/2007 ............. G05G 1/10
WO   WO 2012148010 A1 * 11/2012 ............. B26D 1/046

*Primary Examiner* — Vicky Johnson
(74) *Attorney, Agent, or Firm* — Stevens & Showalter, LLP (57) ABSTRACT

A tiller knob has a top section having a lower periphery with a first plurality of indented segments and a bottom section having an upper periphery with a second plurality of indented segments. When the lower periphery and the upper periphery are mated with one another, the first plurality of indented segments cooperates with the second plurality of indented segments to form separate openings around an outer circumference of the tiller knob. A center section is located between the top section and the bottom section so that outer surfaces of extending segments are exposed through the separate openings. A multi-sectional tiller knob having top and bottom sections formed of a first material and a center section formed of a second material is also disclosed.

21 Claims, 5 Drawing Sheets

(56) References Cited

U.S. PATENT DOCUMENTS 6,701,801 B1 * 3/2004 Wilson .................. B62D 1/043
280/778

* cited by examiner

TILLER KNOB ASSEMBLY FOR STEERING WHEEL

FIELD OF THE INVENTION

The present invention relates generally to materials handling vehicles, and more particularly, to a rotation assistance device that is attached to a steering wheel or tiller of a materials handling vehicle.

BACKGROUND OF THE INVENTION

There are many different designs for steering wheel rotation assistance devices referred to as steering wheel knobs or, when used on materials handling vehicles, tiller knobs. Tiller knobs typically include bulbous bodies formed to fit within an operator's hand and can be made of a wide variety of materials. The material selected for a given tiller knob can affect its usability, durability, and ease-of-maintenance. Some materials may enhance an operator's ability to grip the knob but may not be durable or easy to clean. Other materials may be durable and easy to maintain and clean but may be comparatively difficult for an operator to securely grip.

Thus, there remains a need for a tiller knob that is durable in its intended environment, and also beneficially provides a good gripping surface for an operator.

SUMMARY OF THE INVENTION

A first aspect of embodiments of the present invention relates to a tiller knob assembly for a steering wheel that includes a number of different sections. The tiller knob includes a top section having a lower periphery, wherein the lower periphery comprises a first plurality of indented segments and a bottom section having an upper periphery, wherein the upper periphery comprises a second plurality of indented segments. The first and second plurality of indented segments are arranged such that when the lower periphery and the upper periphery are mated with one another along a mating interface, each of the first plurality of indented segments cooperates with a respective complimentary one of the second plurality of indented segments to form one of a plurality of separate openings around an outer circumference of the mating interface. The knob assembly also includes a center section located between the top section and the bottom section, the center section including a plurality of extending segments, wherein each extending segment includes a respective outer surface exposed through a respective one of the plurality of separate openings.

Another aspect of embodiments of the present invention relates to a steering wheel assembly for a materials handling vehicle that includes a steering wheel and a tiller knob assembly. In particular, the tiller knob assembly includes a number of different sections. The tiller knob includes a top section having a lower periphery, wherein the lower periphery comprises a first plurality of indented segments and a bottom section having an upper periphery, wherein the upper periphery comprises a second plurality of indented segments. The first and second plurality of indented segments are arranged such that when the lower periphery and the upper periphery are mated with one another along a mating interface, each of the first plurality of indented segments cooperates with a respective complimentary one of the second plurality of indented segments to form one of a plurality of separate openings around an outer circumference of the mating interface. The knob assembly also includes a center section located between the top section and the bottom section, the center section including a plurality of extending segments, wherein each extending segment includes a respective outer surface exposed through a respective one of the plurality of separate openings. The steering wheel assembly also includes coupling structure for securely coupling the tiller knob assembly with the steering wheel.

Yet another aspect of embodiments of the present invention relates to a method of assembling a tiller knob assembly for a steering wheel. The method includes providing a top section having a lower periphery, wherein the lower periphery comprises a first plurality of indented segments and locating, below the top section, a bottom section having an upper periphery, wherein the upper periphery comprises a second plurality of indented segments, such that the lower periphery and the upper periphery are mated along a mating interface, wherein the first and second plurality of indented segments are arranged such that when the lower periphery and the upper periphery are mated with one another along the mating interface, each of the first plurality of indented segments cooperates with a respective complimentary one of the second plurality of indented segments to form one of a plurality of separate openings around an outer circumference of the mating interface. Also, the method includes positioning a center section between the top section and the bottom section, the center section including a plurality of extending segments, wherein each extending segment includes a respective outer surface exposed through a respective one of the plurality of separate openings.

Still another aspect of embodiments of the present invention relates to a tiller knob assembly for a steering wheel that includes a number of different sections. In particular, the tiller knob assembly comprises a top section, a bottom section and a center section located between the top section and the bottom section, wherein the top section and the bottom section are comprised of a first material and the center section is comprised of a second material and at least one of the top section and the bottom section has a length greater than the length of the center section.

DETAILED DESCRIPTION OF THE INVENTION

Figure 1:
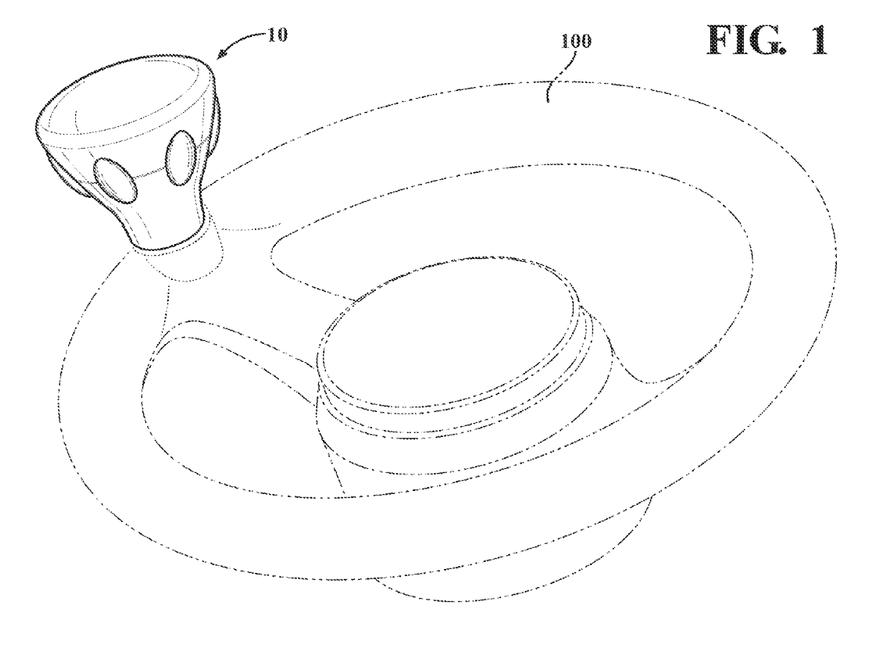
FIG. 1 and FIG. 2 illustrate a multi-sectional tiller knob that can be attached to a steering or tiller wheel in accordance with the principles of the present invention.

A tiller knob assembly 10 for a steering wheel 100 of a materials handling vehicle is illustrated in FIG. 1 in relation to a steering wheel 100. The tiller knob assembly 10 comprises a tiller knob 20, as shown in FIG. 2, and structure illustrated in FIG. 8 for coupling the tiller knob 20 to the steering wheel 100.

Figure 2:
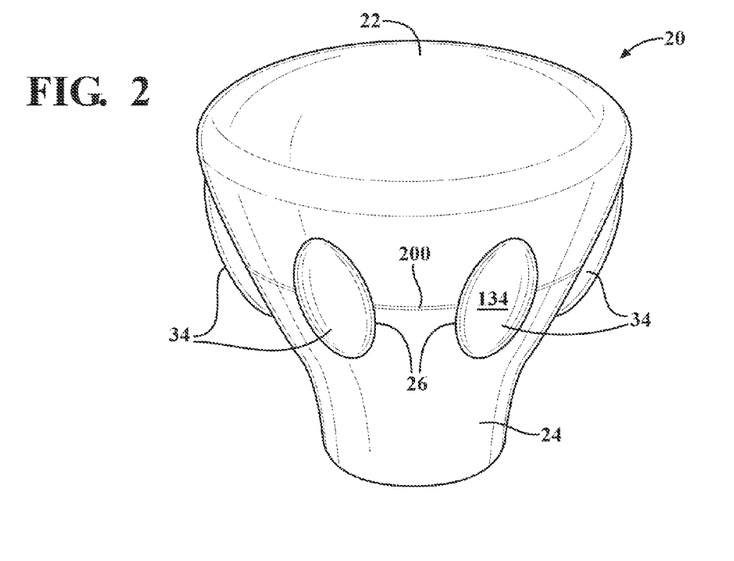
Figure 4:
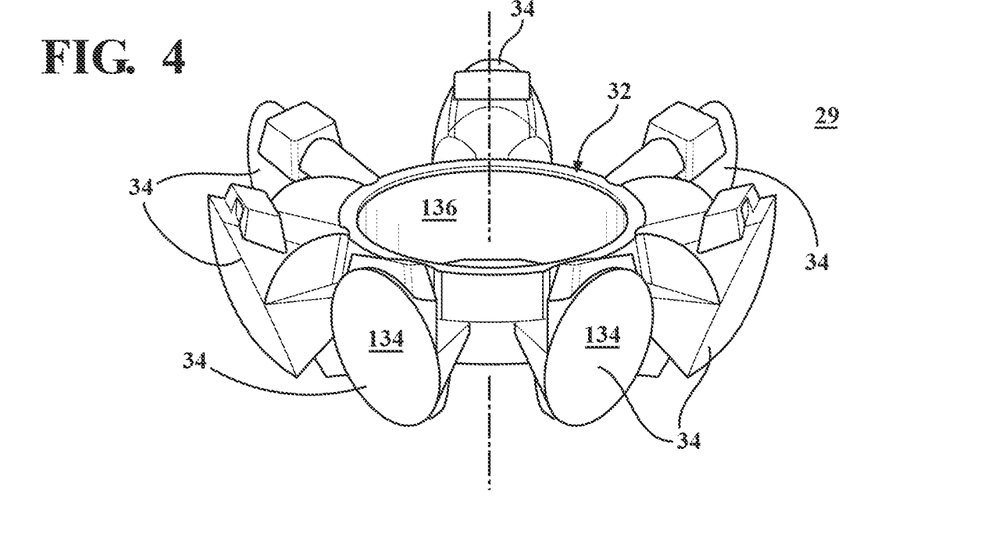
FIG. 4 illustrates a gripping structure, or center section, separate from the other sections of the knob in accordance with the principles of the present invention.

As shown in FIG. 2, the tiller knob 20 can include a top section 22, a bottom section 24, and a center section or gripping structure 29, best shown in FIG. 4. In FIG. 2, only some segments 34 (which may be referred to herein as extending elements, extending segments, gripping segments or extending gripping segments) of the gripping structure 29 are visible. The top section 22 and the bottom section 24 can be formed from a generally smooth hard polymeric material, such as, for example, Polycarbonate/PET and the gripping structure 29 can be formed from a generally soft polymeric material, such as, for example, Copolyester Elastomer, Shore 30D.

The smooth, hard polymeric material of the top section 22 and the bottom section 24 may beneficially provide a surface that is difficult to damage and that may be easily cleaned. The center section is also referred to as the "gripping structure" 29 because its softer material aids an operator using the knob 20 to have a secure grip.

Figure 3:
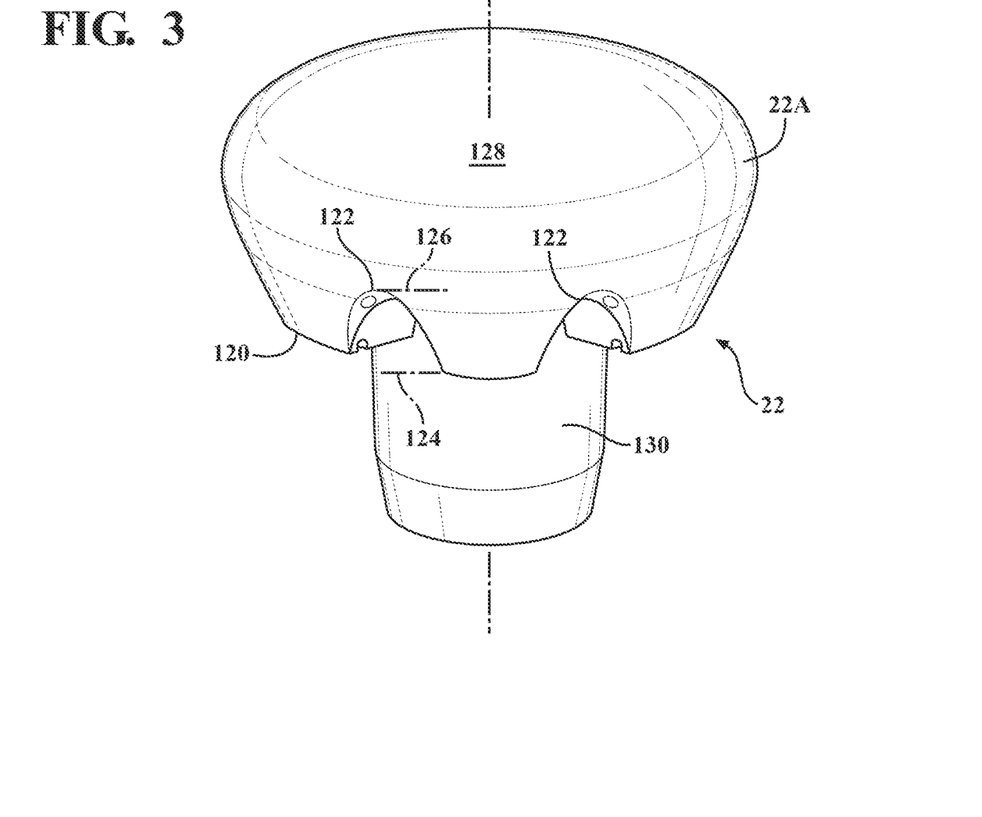
FIG. 3 is a perspective view of a top section separate from the other sections of the knob in accordance with the principles of the present invention.

FIG. 3 illustrates the top section 22 separate from the other sections of the knob 20. The top section 22 includes an upper cap 22A of smooth hard polymeric material that can include a lower periphery 120 that extends around the outside circumference of the top cap 22A. This lower periphery 120 can include a plurality of indented segments 122 spaced around the lower periphery 120. Each indented segment 122 has an upper extent 126 toward a top 128 of the cap 22A and a lower extent 124 at the bottom of the cap 22A illustrated as forming a concavely shaped segment with respect to the lower periphery 120 of the cap 22A. Only two indented segments 122 happen to be visible in FIG. 3 but one of ordinary skill will recognize that the number of indented segments 122 can vary without departing from the scope of the present invention. The top section 22 also includes a central annular portion 130 that extends away from the top 128 of the cap 22A. Preferably, the central annular portion 130 is formed of a metallic material, such as aluminum.

FIG. 4 illustrates the gripping structure 29 separate from the other sections of the knob 20. The gripping structure 29 can include a support frame 32 that can have gripping segments 34 extending radially outward from the frame 32. The support frame 32 can, for example, include an annular opening 136 that is sized to fit around an outside of the central annular portion 130 of the top section 22. Each of the extending gripping segments 34 includes a respective outer surface 134 that, for example, can be formed from a generally soft polymeric material, such as, for example, Copolyester Elastomer, Shore 30D. The shape and arrangement of the extending segments 34 shown in FIG. 4 are merely an example of how an outer surface 134 of soft polymeric material can be exposed to an operator using the knob 20.

Figure 5:
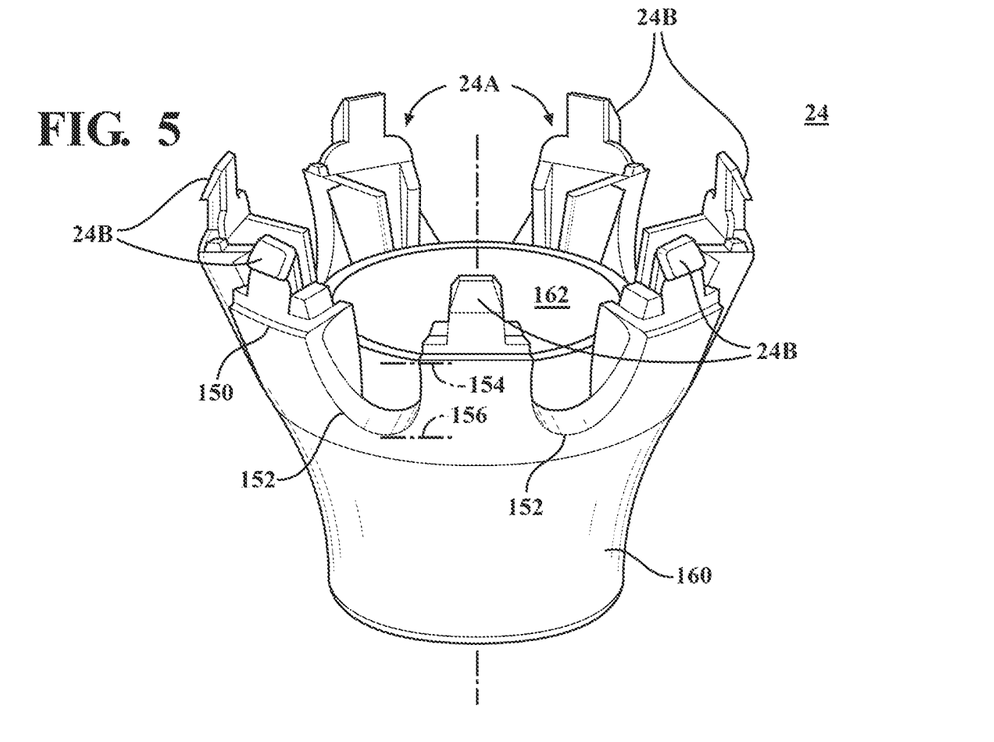
FIG. 5 illustrates a bottom section separate from the other sections of the knob in accordance with the principles of the present invention.

FIG. 5 illustrates the bottom section 24 separate from the other sections of the knob 20. The bottom section 24 can include an upper periphery 150 that extends around the outside circumference of the bottom section 24. This upper periphery 150 can include a plurality of indented segments 152 spaced around the upper periphery 150. Each indented segment 152 has an upper extent 154 of the indented segment 152 closer to a top of the bottom section 24 than a lower extent 156 and is illustrated as forming a concavely shaped segment with respect to the upper periphery 150 of the bottom section 24. Seven indented segments 152 are shown in FIG. 5 but one of ordinary skill will recognize that the number of indented segments 152 can vary without departing from the scope of the present invention. The bottom section 24 also includes a central bottom portion 160 that extends away from the top of the bottom section 24. The central bottom portion 160 can form a cylindrical opening 162 that is sized to fit around an outside of the central annular portion 130 of the top section 22.

The plurality of indented segments 122 of the top section 22 can be considered as a first plurality of indented segments and the plurality of indented segments 152 of the bottom section 24 can be considered as a second plurality of indented segments. If the first and second pluralities of indented segments are of a like number, they can be arranged such that when the lower periphery 120 and the upper periphery 150 are mated with one another along a mating interface shown in FIG. 2 as 200, each of the first plurality of indented segments cooperates with a respective complimentary one of the second plurality of indented segments to form one of a plurality of separate openings 26 around an outer circumference of the mating interface 200. Thus, as shown in FIG. 2, an outer surface 134 of each respective extending segment 34 is exposed through a respective one of the plurality of openings 26.

The top section 22 and the bottom section 24 can be joined together using many different techniques. For example, the two sections 22, 24 can be joined together such that an operator can separate the two sections 22, 24 in order to have access to the center section or gripping structure 29. By having access to the center section or gripping structure 29, the operator can replace the center section if it is damaged or becomes excessively dirty without replacing the entire knob 20.

Figure 6:
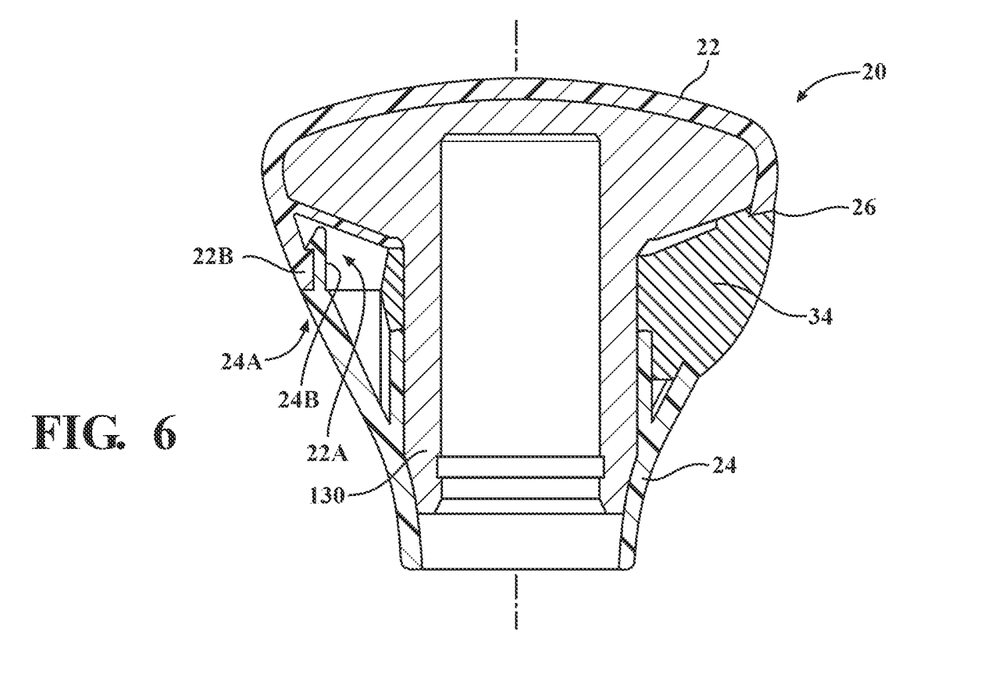
FIG. 6 is a cross-sectional view of an assembled knob illustrating structure of the top and bottom sections of the knob that can be used to attach the bottom section of the knob to the top section of the knob in accordance with the principles of the present invention.

FIG. 5 and FIG. 6 illustrate one example of the structure of the bottom section 24 and structure of the top section 22 that can be used to attach the bottom section 24 to the top section 22. The bottom section 24 can have a plurality of flexible fingers 24A having distal locking protrusions 24B. Each locking protrusion 24B can be received in a corresponding recess 22A provided in the top section 22 where the protrusion 24B can engage with a mating element 22B on the top section 22 so as to secure the top and bottom sections 22 and 24 together with the center section or gripping structure 29. In this way, the gripping structure can be positioned between and clamped by the top and bottom sections 22 and 24. The extending segments 34 or gripping segments can thereby extend through corresponding openings 26 defined by the plurality of indented segments 122, 152 of the top and bottom sections 22 and 24 so that the outer surfaces 134 of the gripping segments can be exposed to an operator using the tiller knob 20.

Because the gripping extending segments 34 can be formed from a soft polymeric material, they allow the tiller knob 20 to be more easily gripped by an operator during operation of the vehicle. The softer polymeric material, however, may be difficult to clean once it becomes dirty or stained. Because the top and bottom sections 22 and 24 are formed from a smooth hard polymeric material, which material can be easily cleaned, a substantial portion of the knob 20 can be maintained in a clean condition over long periods of extended use, while the gripping extending elements 34 allow the tiller knob 20 to be easily gripped by an operator. It is noted that even though the softer polymeric material of the center section or gripping structure 29 may be more difficult to clean once it becomes dirty, the outer surfaces 134 of the gripping extending segments 34 are small areas that contribute little to the overall appearance of the knob 20.

In the above discussion about the accompanying drawings, the openings 26 around the outside of the tiller knob 20 happen to be illustrated as oval in shape. One of ordinary skill will recognize that the plurality of indented segments 122, 152 that define the shape of the openings 26 can be of various shapes and configurations without departing from the scope of the present invention. For example, a variety of circular or polygonal shapes for the openings 26 are considered within the scope of the present invention. In such instances, the shape of each of the extending segments 34 of the center section or gripping structure 29 would also be shaped to complement the shape of each opening 26. Also, a respective shape of each of the plurality of indented segments 122, 152 could vary on a tiller knob 20 so that some of the openings 26 may be differently shaped than other ones of the openings 26. This could create a knob that could be properly assembled only when the top section 22, bottom section 24, and center section or gripping structure 29 are aligned in the appropriate way.

Also, the top section 22 and bottom section 24 are each described and illustrated as a single respective element. However, one of ordinary skill will recognize that either, or both, sections 22, 24 could be multi-piece structures that can still accomplish their intended function. The center section or gripping structure 29 could also be constructed as a multi-piece structure. For example, segments 34 could be individual pieces that are not all attached to a support structure 32.

In the above discussion, the extending gripping segments 34 are part of a center section or gripping structure 29 that is sandwiched between the top section 22 and the bottom section 24. Provision of the gripping surfaces 134, however, could be accomplished in different ways. For example, the plurality of indented segments 122, 152 could form recesses into which "buttons" of material could be press-fit. These buttons could be constructed from the same material as the center section or gripping structure 29 described above. Thus, no separate center section is used but grip-assisting portions could still be provided around the outside of a tiller knob. Alternatively, the indented segments 122, 152 may not be provided at all such that an outside surface of a tiller knob is relatively smooth. Thin patches of soft, grip-assisting material could be adhered to the outside surface to provide assistance with gripping the tiller knob.

Figure 7:
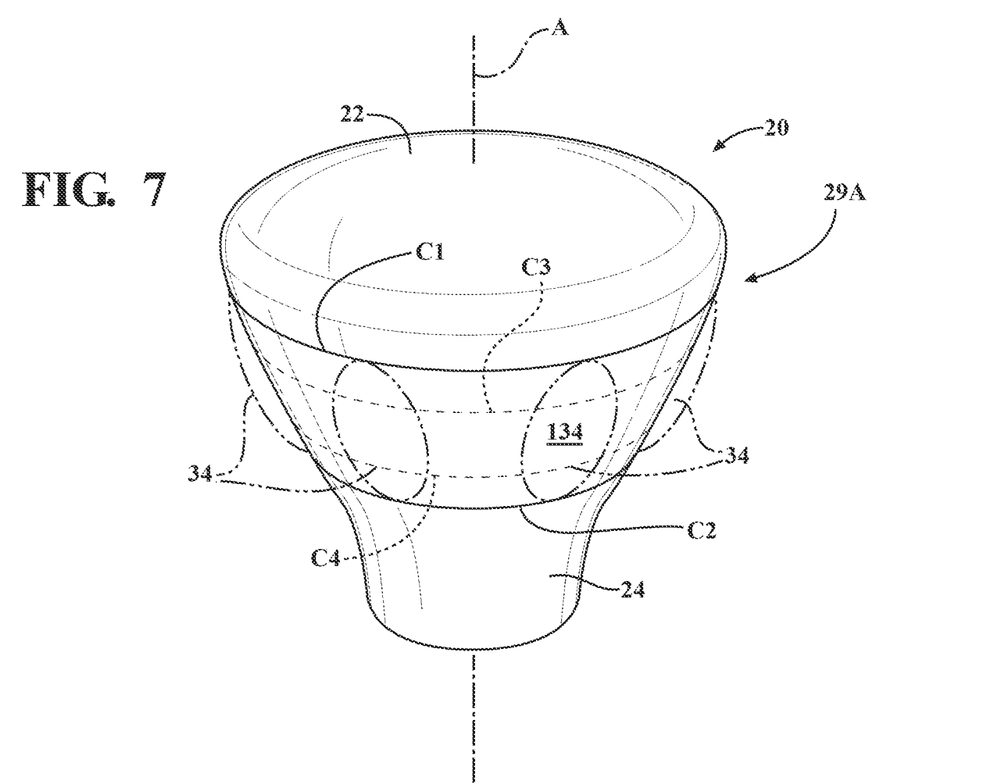
FIG. 7 illustrates a multi-sectional tiller knob comprising gripping structure that extends continuously around the tiller knob in accordance with the principles of the present invention.

In one basic form shown in FIG. 7, an embodiment of a tiller knob assembly 10 for a steering wheel in accordance with the invention of the present application may comprise gripping structure that extends continuously around the tiller knob 20. More particularly, a top section 22, a bottom section 24, and a center section or gripping structure 29A located between the top section 22 and the bottom section 24 is made by forming the top section 22 and the bottom section 24 of a first material and the center section or gripping structure 29A of a second material and forming at least one of the top section 22 and the bottom section 24 to have a length in the axial direction, indicated by axis A, greater than the length of the center section or gripping structure 29A in the axial direction. The second material may be a softer material than the first material to improve the ability of a user to grip the knob assembly 10. As shown in FIG. 7, the gripping structure defined by the center section or gripping structure 29A is continuous around the tiller knob 20 and extends between lines C1 on the top section 22 and line C2 on the bottom section 24. Of course, the center section or gripping structure 29A could be narrower as desired, for example extending only between the dotted lines C3 on the top section 22 and C4 on the bottom section 24.

As shown in FIG. 3, the top section 22 has a lower periphery 120 and a lower portion of the top section 22 extending upward from the lower periphery 120 can be indented inward toward the axis A of the tiller knob 20 to receive an upper portion of the center section or griping structure 29A. Similarly, as shown in FIG. 5, the bottom section 24 has an upper periphery 150 and an upper portion of the bottom section 24 extending downward from the upper periphery 150 can be indented inward toward the axis A of the tiller knob 20 to receive the center section or gripping structure 29A. Thus, the center section or gripping structure 29A is located between the top section 22 and the bottom section 24 within the indented lower portion of the top section 22 and the indented upper section of the bottom section 24. It may be possible to further enhance the gripping characteristics of the tiller knob 20 of FIG. 7 by including at least one segment 34 extending beyond the outer surface of one of the top section 22 and bottom section 24. A plurality of grip enhancing segments 34 are shown in FIG. 7.

Figure 8:
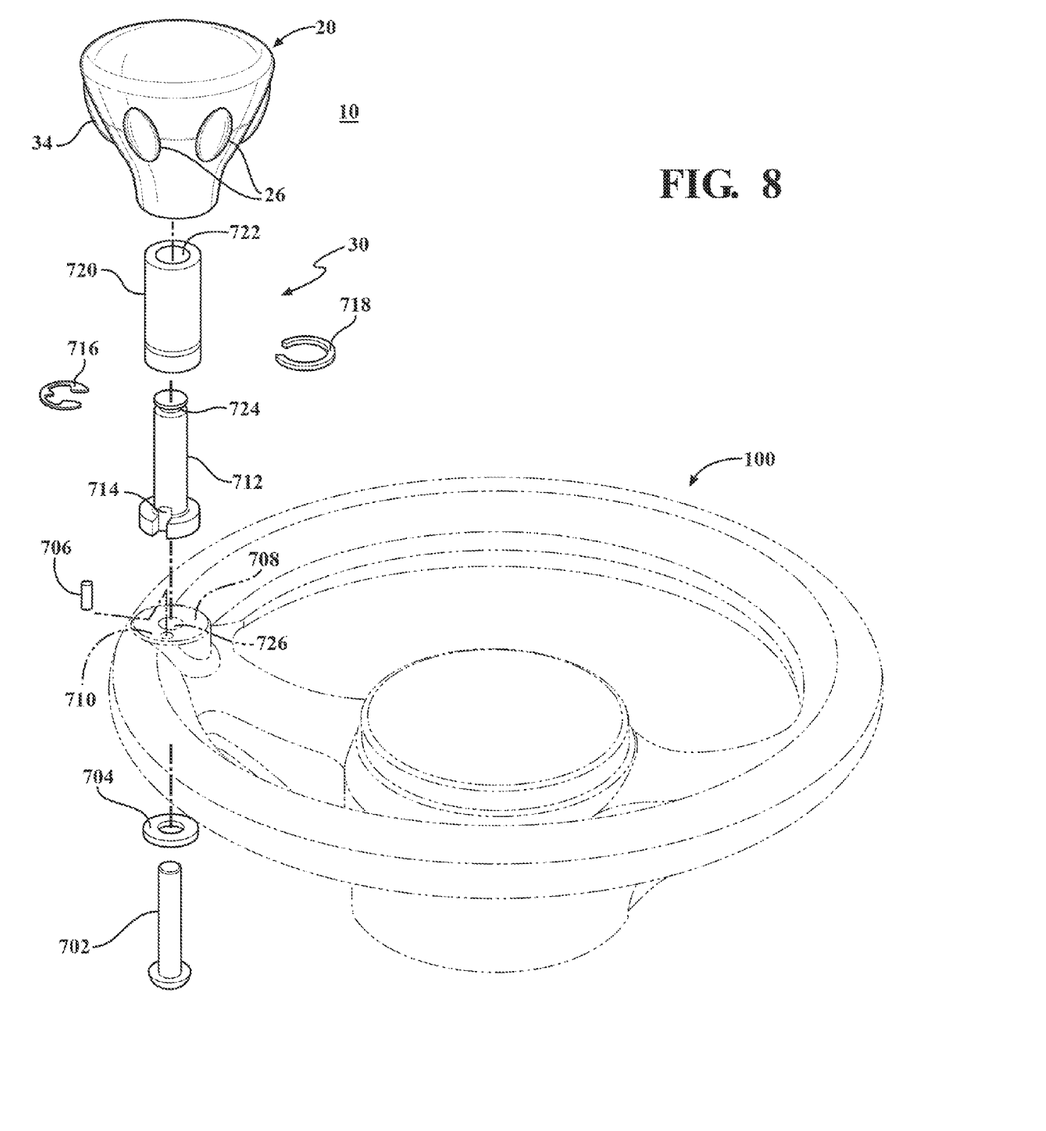
FIG. 8 illustrates one example of how a tiller knob may be coupled with a steering or tiller wheel in accordance with the principles of the present invention.

FIG. 8 illustrates one example of how the tiller knob 20 of the present invention may be coupled with a steering wheel 100. The structure 30 for coupling the tiller knob 20 to the steering wheel 100 is provided by way of example only, and one of ordinary skill will recognize many functionally-equivalent ways to couple the knob 20 to the wheel 100 can be used without departing from the scope of the present invention.

A cylindrical bushing 720 can be sized to fit within the central annular portion 130 that extends away from the top 128 of the cap 22A of the top section 22 (Shown in FIG. 3). Thus, the knob 20 fits over the bushing 720. A clip, or partial O-ring, 718 can be used near the bottom of the bushing 720 to secure the bushing 720 to the knob 20. A central support shaft 712 can extend upwards from the steering wheel 100 through a center opening 722 of the bushing 720. The bushing 720 can be secured to the central support shaft 712 using a retaining clip 716 in a groove 724 formed near a top of the central support shaft 712. Thus, the bushing 720 is free to rotate about the central support shaft 712 while still being securely retained to it. Because the bushing 720 and knob 20 form a tight fit with one another, the knob 20 is free to rotate as well during use by an operator.

The steering wheel 100 can include a region 708 that has an opening 710. The central support shaft 712 rests on the region 708 and has an indented portion 714 which can be aligned with the opening 710. A pin 706 can be used to span the indented portion 714 and extend into the opening 710. In this manner, the central support shaft 712 can be secured to the wheel 100 such that the shaft 712 does not rotate about its central axis. A retaining bolt 702 can pass through a hole 726 in the center of the region 708 so that the bolt 702 extends up into the shaft 712. An outer surface of the bolt 702 and an inside of the shaft 712 can have structure to securely attach the two elements together (e.g., screw threads). A washer 704 may provide beneficial support at the bottom of the hole 726 on the underside of the steering wheel 100.

A method of assembling a tiller knob assembly for a steering wheel can also be described with respect to FIGS. 1-6. The method of assembly can include providing a top section 22 having a lower periphery 120, wherein the lower periphery 120 comprises a first plurality of indented segments 122. Also, in accordance with this method a bottom section 24 can be located below the top section 22 with the bottom section 24 having an upper periphery 150, wherein the upper periphery 150 comprises a second plurality of indented segments 152. When the sections 22, 24 are positioned in this manner the lower periphery 120 and the upper periphery 150 are mated along a mating interface 200, wherein the first and second plurality of indented segments 122, 152 are arranged such that when the lower periphery 120 and the upper periphery 150 are mated with one another along a mating interface 200, each of the first plurality of indented segments 122 cooperates with a respective complimentary one of the second plurality of indented segments 152 to form one of a plurality of separate openings 26 around an outer circumference of the mating interface 200.

However, prior to locating the top section 22 and bottom section 24 in the manner described above, a center section 29 can be positioned between the top section 22 and the bottom section 24. The center section 24 can include a plurality of extending segments 34, wherein each of the extending segments 34 includes a respective outer surface 134 exposed through a respective one of the plurality of separate openings 26.

In the above description, the terms "top", "bottom", "upper", "lower", "below" and "above" are used merely to provide a frame of reference for understanding aspects of the present invention. One of ordinary skill will recognize that these terms are not meant to specify an absolute orientation of each element. Thus, a frame of reference when describing these elements can be changed without departing from the scope of the present invention.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A tiller knob assembly for a steering wheel, comprising:
   a top section having a lower periphery, wherein the lower periphery comprises a first plurality of indented segments;
   a bottom section having an upper periphery, wherein the upper periphery comprises a second plurality of indented segments, and the first and second plurality of indented segments are arranged such that when the lower periphery and the upper periphery are mated with one another along a mating interface, each of the first plurality of indented segments cooperates with a respective complimentary one of the second plurality of indented segments to form one of a plurality of separate openings around an outer circumference of the mating interface; and
   a center section located between the top section and the bottom section, the center section including a plurality of extending segments, wherein each extending segment extends through a respective one of the plurality of separate openings so that an outer surface of each respective extending segment is exposed through a respective one of the plurality of openings.

2. The assembly of claim 1, wherein a top section outer surface and a bottom section outer surface are comprised of a first material and the outer surface of each respective extending segment exposed through a respective one of the plurality of separate openings is comprised of a second material, the first material differing from the second material.

3. The assembly of claim 1, wherein the center section comprises:
   an annular ring configured to encircle an axis that passes through substantially the center of the top section and the bottom section when mated with one another and, wherein, each of the plurality of extending segments extend radially outward from the annular ring.

4. The assembly of claim 1, wherein:
   the top section includes a plurality of first engagement surfaces; and
   the bottom section includes a plurality of second engagement surfaces, wherein each of the plurality of second engagement surfaces interlocks with a respective one of the first engagement surfaces when the top section and bottom section are mated with one another.

5. The assembly of claim 4, wherein the first and second engagement surfaces detachably interlock with one another.

6. The assembly of claim 4 wherein:
   the plurality of first engagement surfaces comprise a plurality of recesses; and
   the plurality of second engagement surfaces comprise a plurality of flexible locking fingers each with a respective protrusion configured to fit within one of the plurality of recesses.

7. The assembly of claim 1, comprising:
   a hollow cylinder having a first end and a second end, wherein the first end is configured to be coupled with a portion of the steering wheel and the second end extends, along a central axis, away from the first end and extends at least partially through each of the bottom section, the center section, and the top section.

8. The assembly of claim 7, wherein the top section, bottom section and center section are rotatable around the central axis of the hollow cylinder.

9. The assembly of claim 7, comprising:
   a locking member configured to pass through the portion of the steering wheel and securely couple with the hollow cylinder.

10. The assembly of claim 1, wherein:
    each of the first plurality of indented segments is concavely shaped; and
    each of the second plurality of indented segments is concavely shaped.

11. The assembly of claim 1, wherein each of the plurality of separate openings has a substantially oval shape.

12. A steering wheel assembly for a materials handling vehicle, comprising:
    a steering wheel;
    a tiller knob assembly, comprising:
      a top section having a lower periphery, wherein the lower periphery comprises a first plurality of indented segments;
      a bottom section having an upper periphery, wherein the upper periphery comprises a second plurality of indented segments, and the first and second plurality of indented segments are arranged such that when the lower periphery and the upper periphery are mated with one another along a mating interface, each of the first plurality of indented segments cooperates with a respective complimentary one of the second plurality of indented segments to form one of a plurality of separate openings around an outer circumference of the mating interface, and a center section located between the top section and the bottom section, the center section including a plurality of extending segments, wherein each extending segment includes a respective outer surface exposed through a respective one of the plurality of separate openings; and coupling structure securely coupling the tiller knob assembly with the steering wheel.

13. A tiller knob assembly for a steering wheel, comprising:

a top section comprised of a first material and having a lower periphery, wherein the lower periphery comprises a first plurality of indented segments;

a bottom section comprised of the first material and having an upper periphery, wherein the upper periphery comprises a second plurality of indented segments, and the first and second plurality of indented segments are arranged such that when the lower periphery and the upper periphery are mated with one another along a mating interface, each of the first plurality of indented segments cooperates with a respective complimentary one of the second plurality of indented segments to form one of a plurality of separate openings around an outer circumference of the mating interface; and a center section located between the top section and the bottom section, the center section including a plurality of extending segments, wherein each extending segment extends through a respective one of the plurality of separate openings so that an outer surface of each respective extending segment is exposed through a respective one of the plurality of openings and is comprised of a second material differing from the first material, wherein the second material comprises soft polymeric material.

14. The assembly of claim 12, wherein a top section outer surface and a bottom section outer surface are comprised of a first material and the exposed respective outer surface of each extending segment is comprised of a second material, the first material differing from the second material.

15. The assembly of claim 14, wherein the second material comprises soft polymeric material.

16. A steering wheel assembly for a materials handling vehicle, comprising:

a steering wheel;

a tiller knob assembly, comprising:

a top section having a lower periphery, wherein the lower periphery comprises a first plurality of indented segments;

a bottom section having an upper periphery, wherein the upper periphery comprises a second plurality of indented segments, and the first and second plurality of indented segments are arranged such that when the lower periphery and the upper periphery are mated with one another along a mating interface, each of the first plurality of indented segments cooperates with a respective complimentary one of the second plurality of indented segments to form one of a plurality of separate openings around an outer circumference of the mating interface, and a center section located between the top section and the bottom section, the center section including a plurality of extending segments, wherein each extending segment includes a respective outer surface exposed through a respective one of the plurality of separate openings; and coupling structure securely coupling the tiller knob assembly with the steering wheel, the coupling structure comprising a hollow cylinder having a first end and a second end, wherein the first end is configured to be coupled with a portion of the steering wheel and the second end extends, along a central axis, away from the first end and extends at least partially through each of the bottom section, the center section, and the top section.

17. The assembly of claim 16, wherein the top section, bottom section and center section are rotatable around the central axis of the hollow cylinder.

18. The assembly of claim 16, further comprising:

a locking member configured to pass through the portion of the steering wheel and securely couple with the hollow cylinder.

19. A method of assembling a tiller knob assembly for a steering wheel, comprising:

providing a top section having a lower periphery, wherein the lower periphery comprises a first plurality of indented segments;

locating, below the top section, a bottom section having an upper periphery, wherein the upper periphery comprises a second plurality of indented segments, such that the lower periphery and the upper periphery are mated along a mating interface, wherein the first and second plurality of indented segments are arranged such that when the lower periphery and the upper periphery are mated with one another along the mating interface, each of the first plurality of indented segments cooperates with a respective complimentary one of the second plurality of indented segments to form one of a plurality of separate openings around an outer circumference of the mating interface; and positioning a center section between the top section and the bottom section, the center section including a plurality of extending segments, wherein each extending segment includes a respective outer surface exposed through a respective one of the plurality of separate openings.

20. A tiller knob assembly for a steering wheel, comprising:

a top section having a lower periphery and a lower portion of the top section extending upward from the lower periphery is indented inward toward an axis of the knob assembly;

a bottom section having an upper periphery and an upper portion of the bottom section extending downward from the upper periphery is indented inward toward an axis of the knob assembly; and a center section located between the top section and the bottom section, the center section including at least one segment that extends beyond an outer surface of one of the top section and the bottom section and wherein the top section and the bottom section are comprised of a first material and the center section is comprised of a second material, wherein at least one of the top section and the bottom section has a length greater than the length of the center section and the center section is located between the top section and the bottom section within the indented lower portion of the top section and the indented upper portion of the bottom section.

21. The assembly of claim 20 wherein the center section includes a plurality of segments extending beyond the outer surface of one of the top section and bottom section.

\* \* \* \* \*